(12) United States Patent
Erivantcev et al.

(10) Patent No.: US 10,509,469 B2
(45) Date of Patent: Dec. 17, 2019

(54) DEVICES FOR CONTROLLING COMPUTERS BASED ON MOTIONS AND POSITIONS OF HANDS

(71) Applicant: Finch Technologies Ltd., Road Town, Tortola (VG)

(72) Inventors: Viktor Vladimirovich Erivantcev, Ufa (RU); Rustam Rafikovich Kulchurin, Ufa (RU); Alexander Sergeevich Lobanov, Ufa (RU); Iakov Evgenevich Sergeev, Ufa (RU); Yana Olegovna Gabdullina, Ufa (RU); Alexey Ivanovich Kartashov, Moscow (RU)

(73) Assignee: FINCH TECHNOLOGIES LTD., Fish Bay, Tortola (VG)

( * ) Notice: Subject to any disclaimer, the term of this patent is extended or adjusted under 35 U.S.C. 154(b) by 0 days.

(21) Appl. No.: 15/492,915

(22) Filed: Apr. 20, 2017

(65) Prior Publication Data

US 2017/0308165 A1 Oct. 26, 2017

Related U.S. Application Data

(60) Provisional application No. 62/325,925, filed on Apr. 21, 2016, provisional application No. 62/463,183, (Continued)

(51) Int. Cl.
*G06F 3/01* (2006.01)
*A63F 13/24* (2014.01)
(Continued)

(52) U.S. Cl.
CPC ............ *G06F 3/014* (2013.01); *A63F 13/211* (2014.09); *A63F 13/235* (2014.09); *A63F 13/24* (2014.09);
(Continued)

(58) Field of Classification Search
CPC ...... G06F 3/014; G06F 3/016; G06F 3/03547; G06F 3/0346; G06F 3/038; G06F 3/017;
(Continued)

(56) References Cited

U.S. PATENT DOCUMENTS 8,187,100 B1 5/2012 Kahn et al.
8,933,886 B2 1/2015 Imoto et al.
(Continued)

FOREIGN PATENT DOCUMENTS

| CN | 103226398 | 7/2013 |
|---|---|---|
| WO | 2016183812 | 11/2016 |
| WO | 2016209819 | 12/2016 |

OTHER PUBLICATIONS

Accessories for Vive, retrieved from https://www.vive.com/us/accessory/ on Jan. 30, 2017.
(Continued)

*Primary Examiner* — Andrew Sasinowski
(74) *Attorney, Agent, or Firm* — Greenberg Traurig, LLP

(57) ABSTRACT

Disclosed herein is a data input device and method of operating the same. In one embodiment, a data input device comprises a plurality of inertial sensor units, one or more touch input devices, a microcontroller configured to collect sensor data from the inertial sensors and the one or more touch input devices and process the sensor data to generate processed sensor data, and a wireless transceiver configured to transmit the processed sensor data to a host computer. In another embodiment, a method comprises receiving sensor data from a handheld device; calculating hand movement characteristics in three dimensional space based on the sensor data; calculating the position and orientation of the components of the handheld device; identifying positions and movements of one or more fingers of a user manipulating the handheld device; identifying a gesture from the positions and movements of one or more fingers of a user
(Continued)

manipulating the handheld device; identifying a recognized gesture corresponding to the identified gesture; and dispatching an event notifying the gesture to an application.

13 Claims, 6 Drawing Sheets

Related U.S. Application Data filed on Feb. 24, 2017, provisional application No. 62/463,209, filed on Feb. 24, 2017, provisional application No. 62/463,252, filed on Feb. 24, 2017.

(51) Int. Cl.

| | |
|---|---|
| *G06F 3/038* | (2013.01) |
| *G06F 3/0354* | (2013.01) |
| *G06F 3/0346* | (2013.01) |
| *A63F 13/211* | (2014.01) |
| *G06F 3/02* | (2006.01) |
| *G06F 3/0338* | (2013.01) |
| *G06F 3/0362* | (2013.01) |
| *A63F 13/235* | (2014.01) |

(52) U.S. Cl.
CPC .............. *G06F 3/016* (2013.01); *G06F 3/017* (2013.01); *G06F 3/038* (2013.01); *G06F 3/0346* (2013.01); *G06F 3/03547* (2013.01); *G06F 3/0202* (2013.01); *G06F 3/0338* (2013.01); *G06F 3/0362* (2013.01); *G06F 2203/0331* (2013.01); *G06F 2203/0384* (2013.01)

(58) Field of Classification Search
CPC ........... G06F 3/0202; G06F 2203/0384; G06F 3/0338; G06F 3/0362; G06F 2203/0331; A63F 13/24; A63F 13/211
See application file for complete search history.

(56) References Cited

U.S. PATENT DOCUMENTS

| | | | |
|---|---|---|---|
| 8,988,438 B2 | 3/2015 | Bang et al. | |
| 9,141,194 B1 | 9/2015 | Keyes et al. | |
| 9,278,453 B2 | 3/2016 | Assad | |
| 9,405,372 B2 | 8/2016 | Yen et al. | |
| D772,986 S | 11/2016 | Chen et al. | |
| 9,504,414 B2 | 11/2016 | Coza et al. | |
| 9,600,925 B2 | 3/2017 | Katz et al. | |
| 9,891,718 B2 | 2/2018 | Connor | |
| 9,996,945 B1 | 6/2018 | Holzer et al. | |
| 10,019,806 B2 | 7/2018 | Perry et al. | |
| 2003/0142065 A1 | 7/2003 | Pahlavan | |
| 2007/0050597 A1 | 3/2007 | Ikeda | |
| 2007/0273610 A1 | 11/2007 | Baillot | |
| 2008/0088468 A1 | 4/2008 | Kim | |
| 2009/0322763 A1 | 12/2009 | Bang et al. | |
| 2010/0079466 A1 | 4/2010 | Griffin | |
| 2011/0161804 A1 | 6/2011 | Park et al. | |
| 2012/0025945 A1 | 2/2012 | Yazadi et al. | |
| 2012/0130203 A1 | 5/2012 | Stergiou et al. | |
| 2012/0214591 A1* | 8/2012 | Ito ...................... | A63F 13/5255 463/31 |
| 2012/0293410 A1 | 11/2012 | Bell | |
| 2014/0028547 A1 | 1/2014 | Bromley et al. | |
| 2014/0201689 A1 | 7/2014 | Bedikian et al. | |
| 2014/0313022 A1 | 10/2014 | Moeller et al. | |
| 2015/0062086 A1 | 3/2015 | Nattukallingal | |
| 2015/0077347 A1* | 3/2015 | O'Green ............... | G06F 3/014 345/173 |
| 2015/0145860 A1 | 5/2015 | Craig et al. | |
| 2015/0145985 A1 | 5/2015 | Gourlay et al. | |
| 2015/0277559 A1 | 10/2015 | Vescovi et al. | |
| 2015/0358543 A1* | 12/2015 | Kord .................. | G06F 3/011 345/474 |
| 2016/0005232 A1 | 1/2016 | Quarles | |
| 2016/0054797 A1* | 2/2016 | Tokubo ................ | G06F 3/012 345/633 |
| 2016/0077608 A1* | 3/2016 | Nakasu ................ | G06F 3/0487 345/156 |
| 2016/0187969 A1 | 6/2016 | Larsen et al. | |
| 2016/0306431 A1 | 10/2016 | Stafford et al. | |
| 2016/0313798 A1* | 10/2016 | Connor ................ | G06F 3/017 |
| 2016/0378204 A1 | 12/2016 | Chen et al. | |
| 2017/0053454 A1 | 2/2017 | Katz et al. | |
| 2017/0083084 A1 | 3/2017 | Tatsuta et al. | |
| 2017/0115728 A1 | 4/2017 | Park et al. | |
| 2017/0352188 A1 | 12/2017 | Levitt | |
| 2018/0095637 A1 | 4/2018 | Valdivia et al. | |
| 2018/0101989 A1 | 4/2018 | Frueh et al. | |
| 2018/0165879 A1 | 6/2018 | Holzer et al. | |
| 2018/0217680 A1 | 8/2018 | Sudou et al. | |
| 2018/0225517 A1 | 8/2018 | Holzer et al. | |
| 2018/0253142 A1 | 9/2018 | Tsuchie et al. | |
| 2018/0313867 A1 | 11/2018 | Erivantcev et al. | |
| 2018/0335834 A1 | 11/2018 | Erivantcev et al. | |
| 2018/0335843 A1 | 11/2018 | Erivantcev et al. | |
| 2018/0335855 A1 | 11/2018 | Erivantcev et al. | |
| 2019/0187784 A1 | 6/2019 | Erivantcev et al. | |
| 2019/0212359 A1 | 7/2019 | Erivantcev et al. | |
| 2019/0212807 A1 | 7/2019 | Erivantcev et al. | |

OTHER PUBLICATIONS

Daydream, retrieved from https://vr.google.com/daydream/ on Jan. 30, 2017.
Forward kinematics, Wikipedia, retrieved from https://en.wikipedia.org/wiki/Forward_kinematics on Sep. 21, 2017.
Gest—Work with your hands. Wayback Machine 2016. Retrieved from https://web.archive.org/web/20160304012247/https://gest.co/ on Jan. 30, 2017.
Gloveone: Feel Virtual Reality. Wayback Machine 2016. Retrieved from https://web.archive.org/web/20160307080001/https://www.gloveonevr.com/ on Jan. 30, 2017.
International Application No. PCT/US2017/028982, International Search Report and Written Opinion, dated Aug. 24, 2017.
Manus VR—The Pinnacle of Virtual Reality Controllers, Manus VR Development Kit Pro Q4 2016.
Manus VR—The virtual reality dataglove for consumers. Wayback Machine 2016. Retrieved from https://web.archive.org/web/20160417035626/https://manusvr. com/ on Jan. 30, 2017.
NeuroDigital: The VR Technology Factory, retrieved from https://www.neurodigital.es/ on Jan. 30, 2017.
Oculus Rift | Oculus. Retrieved from https://www3.oculus.com/enus/ rift/ on Jan. 30, 2017.
RevolVR Virtual Reality Controllers, retrieved from http://revolvr.co/ on Jan. 30, 2017.
Wireless Gaming Controllers for PC, Mac, and Mobile | SteelSeries, retrieved from https://steelseries.com/gamingcontrollers on Jan. 30, 2017.
Xbox Wireless Controller, retrieved from http://www.xbox.com/en-US/xbox-one/accessories/controllers/xbox-wireless-controller on Jan. 30, 2017.
U.S. Appl. No. 15/792,255, filed Oct. 24, 2017, Viktor Erivantcev, et al.
Calibration of Inertial Measurement Units Attached to Arms of a User to Generate Inputs for Computer Systems, U.S. Appl. No. 15/817,646, filed Nov. 20, 2017, Viktor Erivantcev, et al.
Tracking Arm Movements to Generate Inputs for Computer Systems, U.S. Appl. No. 15/787,555, filed Oct. 18, 2017, Viktor Erivantcev, et al.
Tracking Finger Movements to Generate Inputs for Computer Systems, U.S. Appl. No. 15/792,255, filed Oct. 24, 2017, Viktor Erivantcev, et al.
Tracking Arm Movements to Generate Inputs for Computer Systems, U.S. Appl. No. 16/508,249, filed Jul. 10, 2019, Viktor Erivantcev, et al.

(56) References Cited

OTHER PUBLICATIONS

Tracking Torso Orientation to Generate Inputs for Computer Systems, U.S. Appl. No. 15/813,813, filed Nov. 15, 2017, Viktor Erivantcev, et al.

Calibration of Inertial Measurement Units Attached to Arms of a User and to a Head Mounted Device, U.S. Appl. No. 15/847,669, filed Dec. 19, 2017, Viktor Erivantcev, et al.

Correction of Accumulated Errors in Inertial Measurement Units Attached to a User, U.S. Appl. No. 15/868,745, filed Jan. 11, 2018, Viktor Erivantcev, et al.

Tracking Torso Leaning to Generate Inputs for Computer Systems, U.S. Appl. No. 15/864,860, filed Jan. 8, 2018, Viktor Erivantcev, et al.

Tracking User Movements to Control a Skeleton Model in a Computer System, U.S. Appl. No. 15/973,137, filed May 7, 2018, Viktor Erivantcev, et al.

Motion Predictions of Overlapping Kinematic Chains of a Skeleton Model Used to Control a Computer System, U.S. Appl. No. 15/996,389, filed Jun. 1, 2018, Viktor Erivantcev, et al.

Calibration of Measurement Units in Alignment with a Skeleton Model to Control a Computer System, U.S. Appl. No. 16/044,984, filed Jul. 25, 2018, Viktor Erivantcev, et al.

\* cited by examiner

DEVICES FOR CONTROLLING COMPUTERS BASED ON MOTIONS AND POSITIONS OF HANDS

CROSS-REFERENCE TO RELATED APPLICATIONS

The present claims priority under 35 U.S.C. § 119(e) to Prov. U.S. Pat. App. Ser. Nos. 62/325,925, filed Apr. 21, 2016 and entitled "Hand-Worn Devices for Controlling Computers based on Motions and Positions of Hands and Fingers", 62/463,183, filed Feb. 24, 2017 and entitled "Devices for Controlling Computers based on Motions and Positions of Hands and Arms," 62/463,209, filed Feb. 24, 2017 and entitled "Devices for Controlling Computers based on Motions and Positions of Hands," 62/463,252, filed Feb. 24, 2017 and entitled "Devices for Controlling Computers based on Motions and Positions of Hands and Arms," the entire disclosures of each application are hereby incorporated herein by reference.

TECHNICAL FIELD

The embodiments disclosed herein relate to computer input devices in general and more particularly but not limited to input devices for virtual reality and/or augmented/mixed reality applications implemented using computing devices, such as mobile phones, smart watches, similar mobile devices, and/or other devices.

BACKGROUND

Conventional input devices (e.g., keyboards or mice) are mainly used for entering information. Such devices have different variations. A keyboard can be configured in the form of a board or a tape with a set of keys; an integrated, condensed keyboard (e.g., keypads of mobile phones, where the input character depends on the number of clicks on a certain button on the amount of time); or in the form of an application (e.g., for phones with touch screens). A mouse-type device for a graphical user interfaces can be replaced by a trackball, joystick, or touch of a finger on a touch screen. Entering user information can also be carried out via voice commands or with the help of optical gesture recognition system. Other input devices are gloves with sensors of various types.

U.S. Pat. App. Pub. No. 2015/0277559 discloses a ring computing device.

Chinese Pat. App. Pub. No. 103226398 discloses data gloves that use micro-inertial sensor network technologies, where each micro-inertial sensor is an attitude and heading reference system, having a tri-axial micro-electromechanical system (MEMS) micro-gyroscope, a tri-axial micro-acceleration sensor and a tri-axial geomagnetic sensor which are packaged in a circuit board. U.S. Pat. App. Pub. No. 2014/0313022 and U.S. Pat. App. Pub. No. 2012/0025945 disclose other data gloves.

U.S. Pat. No. D772,986 discloses the ornamental design for a wireless game controller.

U.S. Pat. App. Pub. No. 2007/0050597 discloses a game controller that has an acceleration sensor and a gyro sensor.

The disclosures of the above discussed patent documents are hereby incorporated herein by reference.

BRIEF SUMMARY

In one embodiment, the disclosure describes a data input device comprising a plurality of inertial sensor units, one or more touch input devices, a microcontroller configured to collect sensor data from the inertial sensors and the one or more touch input devices and process the sensor data to generate processed sensor data, and a wireless transceiver configured to transmit the processed sensor data to a host computer.

In another embodiment, the data input device further comprises a plurality of rings configured to be worn on fingers of a hand of a user wherein the plurality of inertial sensor units are respectively mounted in the plurality of rings. In another embodiment, the plurality of rings are communicatively coupled to the base unit via a set of cables connecting from the rings to the base unit.

In another embodiment, the one or more touch input devices includes a touchpad device mounted on one of the plurality of rings and adapted to receive touch inputs activated by the thumb of a hand of the user.

In another embodiment, the data input device further comprises a base housing adapted to be strapped to a backside of the hand of the user, wherein the base unit houses the microcontroller and the wireless transceiver. In another embodiment, the base housing further comprises a base inertial sensor unit communicatively coupled to the microcontroller.

In another embodiment, the data input device further comprises a plurality of haptic actuators communicatively coupled to the microcontroller to provide haptic sensory feedback.

In another embodiment, the data input device further comprises a plurality of LEDs communicatively coupled to the microcontroller. In another embodiment, a first set of the plurality of LEDs are mounted within the base housing and a second set of the plurality of LEDs are mounted within the plurality of rings.

In another embodiment, the inertial sensor units each include an accelerometer and gyroscope. In another embodiment, the inertial sensor units each include an accelerometer, gyroscope, and magnetometer. In another embodiment, the data input device further comprises one or more of vibration haptic actuators, ultrasound receivers, and optical markers.

In another embodiment, the processed sensor data comprises one or more of gyroscope vector data, acceleration vector data, quaternion rotation data, spatial coordinate data of a hand or wrist, and touch data from the one or more touch input devices.

In another embodiment, the plurality of inertial sensor units, the one or more touch input devices, the microcontroller and the wireless transceiver are housed within a handheld module adapted to be held in the hand of a user.

In another embodiment, data input device further comprises an arm module adapted to be secured to a shoulder or upper arm of the user and housing an additional inertial sensor unit and a second wireless transceiver, wherein the arm module and handheld module are independently moveable with respect to one another.

In another embodiment, the one or more touch input devices comprise one or more trigger devices located on the front portion of the handheld module and adapted to be manipulated by the fingers of a user while the user is holding the handheld device.

In another embodiment, the one or more touch input devices include touch input devices located on the top side of the handheld module selected from the group consisting of buttons, pointing sticks, trackballs, and touch pads.

In another embodiment, the handheld module further comprises a knob and a receptacle, wherein the knob of the handheld module is configured to be locked into a receptacle of a secondary handheld module and wherein the receptacle of the handheld module is configured to receive a knob of the secondary handheld module.

In another embodiment, the plurality of touch inputs comprise a joy stick, power button, and action button arranged linearly on the top side of the handheld module, wherein the handheld module is configured to be held in the hand of a user wherein the plurality of touch inputs are capable of being manipulated by the thumb of a user, and wherein the power button is configured to enable the pairing and unpairing of the device with the host computer.

In one embodiment, the disclosure describes a method comprising: receiving sensor data from a handheld device; calculating hand movement characteristics in three dimensional space based on the sensor data; calculating the position and orientation of the components of the handheld device; identifying positions and movements of one or more fingers of a user manipulating the handheld device; identifying a gesture from the positions and movements of one or more fingers of a user manipulating the handheld device; identifying a recognized gesture corresponding to the identified gesture; and dispatching an event notifying the gesture to an application.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Some embodiments disclosed herein include multiple-sensor, hand-worn devices for motion capturing and positioning of hand and fingers in virtual reality ("VR") or augmented/mixed reality ("AR") applications (collectively, "VR/AR" applications) and controlling computing devices via gesture recognition. The hand-worn devices can be used for interaction with VR/AR applications implemented on mobile platforms for data input and/or control interface, in systems for training, simulation, playing, gaming, etc.

The hand-worn devices disclosed herein can be used to enter information into the computing device (including mobile devices) in interaction with a VR/AR application and in normal use without a VR/AR environment. Conventional input devices for normal uses in a computer application are not convenient in interaction with VR/AR applications. The hand-worn devices of the present disclosure are easy and convenient to use in entering information into computing devices during a VR/AR interaction and outside VR/AR interaction.

The hand-worn devices can be used to provide low latency visualization of hands movements in VR/AR space, allow virtual QWERTY keyboard with typing speed comparable to tablet/smartphone, and facilitates gesture inputs corresponding to moving, shooting, boxing, pointing, picking, selecting using ergonomic finger movements and touch pad activation (without limitation to other types of input gestures). The hand-worn devices can also be used to implement intuitive gestures that are standard on touch screen on smartphones and mouse-based graphical user interfaces, such as sliding, swiping, zooming, selecting, pointing, and clicking.

The use of conventional key and/or command based user input systems requires training and skills to enter data quickly. These devices may require an unnatural hand position, which can cause diseases in the joints, nerves and muscle tension (so-called "tunnel syndrome" or carpal tunnel syndrome). These devices may also need the change of hands to achieve certain types of input combinations. Voice and optical input based input systems have disadvantages in intensive resource requirements in terms of technologies, additional equipment, the absence of noise or visual disturbances. Conventional data gloves with sensors typically have the drawbacks in awkwardness, immobility, redundancy of components, and limited input concepts (such as absence of clicking and sliding).

Figure 1:
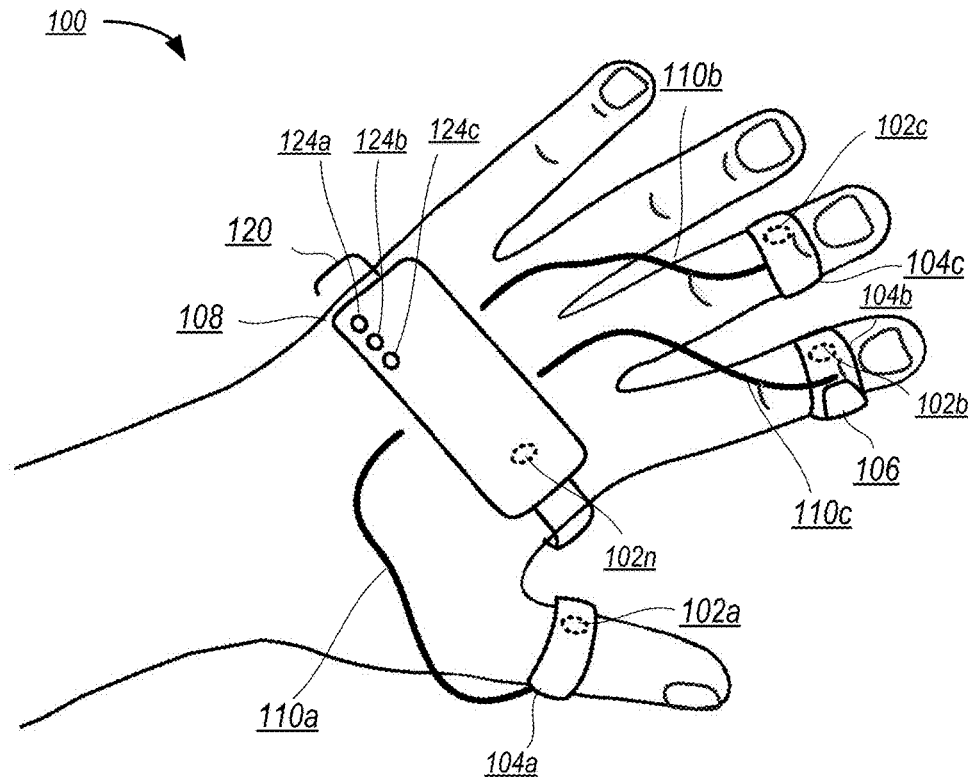
FIG. 1 illustrates an input device according to some embodiments of the disclosure.
Figure 2:
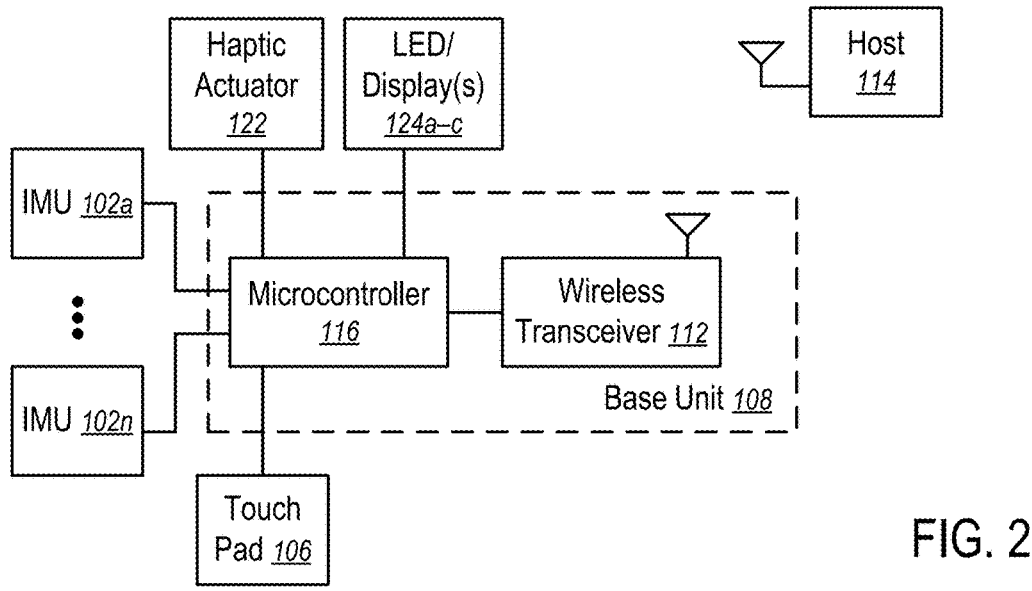
FIG. 2 illustrates a block diagram of an input device according to some embodiments of the disclosure.

FIG. 1 illustrates an input device according to some embodiments of the disclosure. FIG. 2 illustrates a block diagram of an input device according to some embodiments of the disclosure.

In one embodiment, a data input device (100) includes inertial sensors (e.g., 102a-c) mounted inside rings (104a-c) configured to be worn on fingers of a hand of a user as illustrated in FIG. 1. In one embodiment, an inertial sensor comprises a micro-electromechanical system (MEMS) inertial measurement unit (IMU).

In the illustrated embodiment, one ring (104b) includes a touch pad (106) mounted on the ring (104b) and adapted to receive touch inputs activated by the thumb of the same hand of the user including one or more click buttons incorporated into the touch pad mount.

In one embodiment, base unit (108) adapted to be strapped to the back of the palm of the hand is configured to collect sensor data from the inertial sensors (102a-n) and the touch pad (106) and perform initial processing of the sensor data via a microcontroller unit ("MCU") (116).

In the illustrated embodiment, a wireless transceiver (112) is housed within the base unit (108) and is configured to transmit results of the initial processing from the MCU (116) to a host computer (114) (e.g., a mobile phone, a smart watch, a personal media player, a tablet computer, a personal computer, a notebook computer, etc.).

In FIGS. 1 and 2, a set of cables (110a-c) communicatively connect the rings (120a-c) to the MCU (116).

In some embodiments, the MCU (116) and the wireless transceiver (112) can be housed in a base unit (108) as illustrated in FIGS. 1 and 2. The base unit (108) is adapted to be removably secured to the back of the palm of the hand of the user (e.g., using a strap (120) that wraps around the palm of the hand).

The base unit (108) may also include a base IMU sensor unit (102n) (or multiple of IMU sensor units).

Further, the base unit (108) and/or one or more of the rings (104a-c) may include haptic actuators (122) to provide haptic sensory feedback to the user.

Further, LED lights (124a-c) (and/or other display devices) can be configured on the base unit (108) and/or one or more of the rings (104a-c) to provide visual feedback to the user. In alternative embodiments, a camera that generates additional inputs based on the signals from the LED lights (124a-c) (and/or other display devices) may be included.

In one embodiment, the MCU (116) includes a memory storing instructions controlling the operation of the MCU (116) to perform primary processing of the sensor data and controls the operation of the input device (100). System software can be used to perform low level interactions between the input device (100) and a host computer (114), such as a personal computer, a tablet computer, a smartphone, a personal media player, etc. Application software can be used to process the input data generated by the input device (100) to perform application-specific actions.

An IMU (e.g., 102a-n) in one embodiment is configured to measure its movement along three axes. For each of the axes, it may have a MEMS accelerometer configured to measure the difference between its true acceleration and its gravitational acceleration, and a MEMS gyroscope configured to measure its angular velocity, and a magnetometer configured to measure the magnitude and direction of the magnetic field at its location in space.

In some embodiments, the IMUs (102a-n) mounted on some of the components measures only two axes. For example, the IMU (102n) in the base unit (108) measures along three axes, while the IMUs (102a-c) mounted in the rings measure alone two axes (and without magnetometer). Thus, the overall cost of the input device (100) can be reduced.

The touch pad (106) of one embodiment is mounted on a ring (104b) adapted to be touched by the thumb of the same hand. The touch pad (106) can be formed by the capacitive sensor technologies. Preferably, the touch pad (106) has a diameter of 1.2 to 1.5 cm (or oval form with dimensions 1.2 to 1.5 cm height and 1.5 to 2.0 cm length), located on the outer lateral side of the ring (104b) on the index finger. The touch pad (106) can also be implemented using alternative technologies, such as resistive sensors, analog stick, compact optical sensors, Hall-effect sensor, piezoelectric sensors, etc.

The rings (104a-c) may or may not be fully closed.

The MCU (116) combines the sensor signals from the IMUs (102a-n) and touch pad (106) and carries out the processing and transfer of the input data to the host via the wireless transceiver (112) (e.g., via Bluetooth or Wi-Fi).

Alternative, a wired connection from the base unit (108) to the host computer (114) can be used to communicate the input signal to the host computer (114). The input device (100) may be powered via the wired connection and/or charge the battery of the input device (100).

In some embodiments, the input device (100) includes a battery to power the operations of the input device (100). The battery is housed in the base unit (108), which is configured with a port for a wire connection (e.g., to a charger and/or the host computer).

In some embodiments, an additional inertial sensor is mounted on one of: the wrist, the hand, the back of the hand, the forearm of the user, the chest, and feet, ankle (i.e. full suit option). In these and other embodiments, the inertial sensor may include an optional wireless transceiver and battery/ accumulator. When the optional transceiver is used, the base unit (108) further includes an additional receiver device to collect the sensor data sent by these additional IMUs. For example, an additional inertial sensor (IMU) can be configured in an armband to be worn in the biceps area above elbow; the combination of the sensor data from the armband and the sensor data from the finger rings (104a-c) allows for accurate hand positioning.

In one embodiment, the input device (100) includes visual indicators (124a-c) (e.g., LED lights) that are configured to indicate the operation status of the input device (100) and/or the processed data. The indicators can be housed on the base unit (108), or mounted on one or more of the rings (104a-c). In some embodiments, the indicators are arranged to form a placard.

In FIG. 1, three rings (104a-c) are configured for the thumb, the index finger and the middle finger. Optionally, additional rings can be provided for each of the five fingers. In other embodiments, an input device (100) having fewer rings than that illustrated in FIG. 1 can be used also.

In one embodiment, the input device (100) includes vibrational motors (actuators) to provide feedback to some or each finger/ring/base unit/additional mounts.

After the user wears the input device (100) on a hand and launches an application on the host computer (114) that uses the input device (100), the input data generated by the MCU (116) based on the sensor (102a-n) data is transmitted from the device (100) to the host computer (114) via a wired or wireless connection. System software on the host computer (114) recognizes gestures from the input data and performs actions that are triggered by the gestures in application software.

For example, the MCU (116) reads data from the IMUs (102a-n) and the touch pad (106). The data is processed (e.g., filtered, normalized, and standardized). The input device (100) forms a data packet containing a processed data from the IMUs (102a-n) and the touch pad (106) and transmits the data packet to the host computer (114), such as a personal computer, a tablet computer, a smartphone, a personal media player, etc. System software on the host computer (114) is configured to process the input data to recognize gestures indicated in the input data and/or other standardized input events. Application software receives input events from the system software and performs application specific operations corresponding to the input events.

In some embodiments, each of the rings has a wireless transceiver to transmit its sensor data to the base unit (108) and/or to the host computer (114).

In one embodiment, the data set received from the sensors (102a-n) includes gyroscope data for each axis of measurement, accelerometer data for each axis, optional magnetometer data for each axis.

In one embodiment, the base unit (108) is configured to compute the quaternion rotations from the gyroscope data. Optionally, approximate spatial coordinates of the hand/ wrist with respect to an initial position are computed from the accelerometer data. Further, the base unit (108) uses the data set received from the touch pad (106) to identify the position coordinates of the finger touch on the touch pad (106), clicking events, and squeezing events.

The base unit (108) transmits the processed data from the input device (100) to a host (114), such as a smartphone, a desktop computer, a head mount display device, and a smart watch.

The data transmitted from the base unit (108) to the host may include: gyroscope vector, acceleration vector, a quaternion rotation, coordinates of the hand/wrist, touch data from the touch pad (106), etc.

The system software uses the low-level functions of the system, generally does not have a GUI for the user, and is performed in the background. The system software retrieves data from the input device (100), handling and forwarding the input to application software on demand.

Application software implements the application-specific function and usually has a graphical interface. For example, application software may implement a virtual reality (or augmented/mixed reality) game. Using a set of tools and documentations of the system software, a developer may create application software for a specific purpose using the input from the input device (100).

In one embodiment, the input device (100) as illustrated in FIG. 1 further includes: vibration haptic actuators (e.g., inside the base unit (108) or, optionally, at some or each of the finger rings (104a-c)); one or more optional ultrasound receivers (microphones) inside the base unit (108); and one or more optical markers (active or passive, e.g., lit or not lit) on the surface of the base unit (108) for optical tracking of the input device (100).

In one embodiment, the input device (100) as illustrated in FIG. 2 further includes microphones (not illustrated) connected to the MCU (116); and additional haptic actuators (122) connected to the MCU (116).

In one embodiment, the input device (100) as illustrated in FIG. 2 further includes a receiver connected to the MCU (116), where the receiver is connected with complementary IMUs incorporated into additional bands (e.g., to be worn on arms, wrists, the forearms, chest, feet, ankles, etc.) and/or rings (e.g., to be worn on fingers), where each of the bands and rings includes an IMU, a communication device (e.g., a transceiver for wireless or wired communications), and/or a power source (e.g., battery/accumulator).

Figure 3:
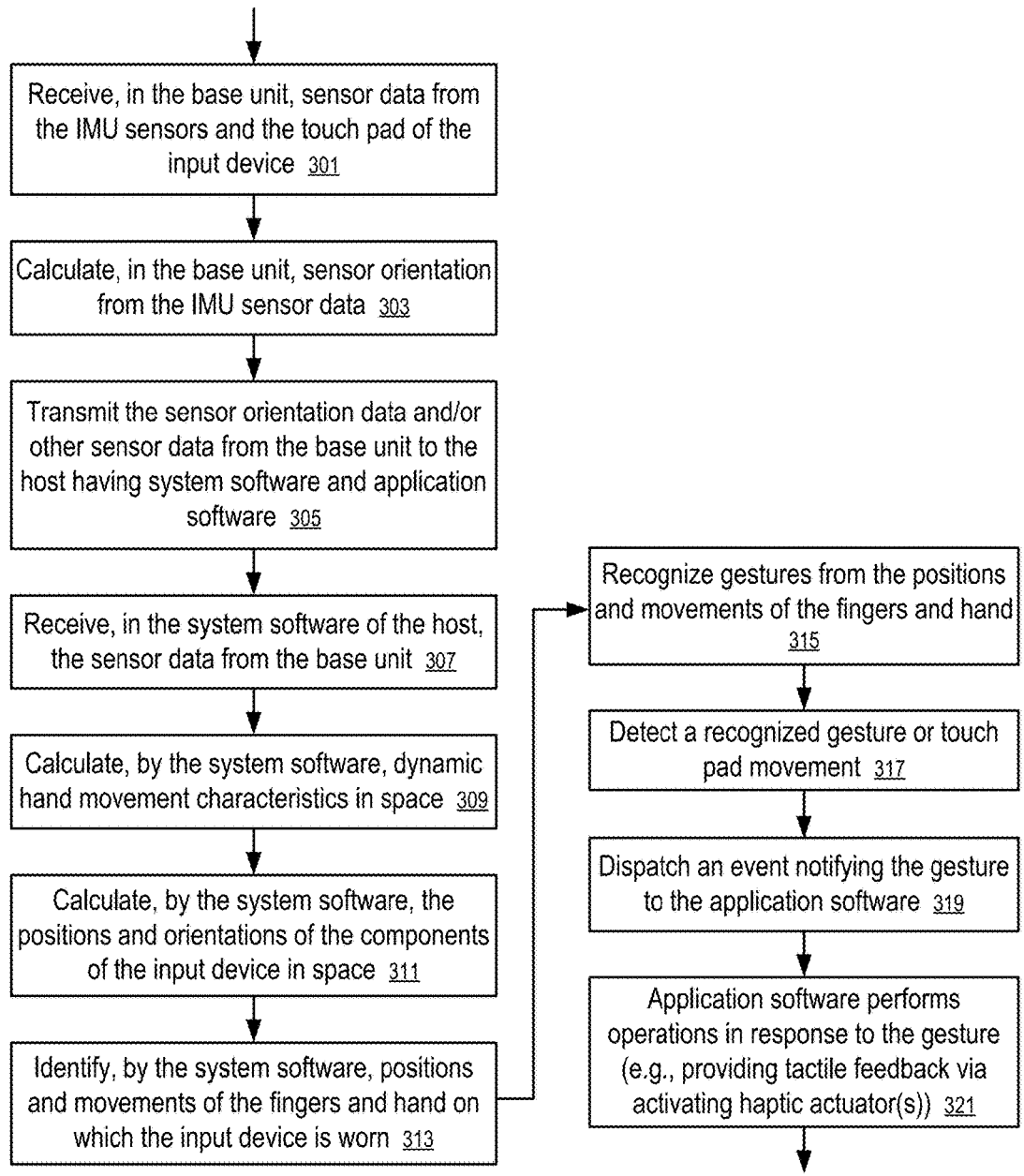
FIG. 3 is a flow diagram illustrating a method to process input data according to some embodiments of the disclosure.

FIG. 3 is a flow diagram illustrating a method to process input data according to some embodiments of the disclosure.

In step 301, the method receives, in the base unit, sensor data from the IMU sensors and the touch pad of the input device. As described herein, in some embodiments, an IMU includes MEMS accelerometers, a MEMS gyroscope, and/or a magnetometer. In some implementations, magnetometers are not used. In some embodiments, sensor data generated by an IMU includes data representing, for example, difference between the true acceleration of accelerometers and the gravitational acceleration of accelerometers. Alternatively, or in conjunction with the foregoing, sensor data includes the angular velocity of the gyroscope of an IMU. Alternatively, or in conjunction with the foregoing, sensor data includes the magnitude and direction of the magnetic field at the location of the magnetometer in an IMU (if present).

In step 303, the method calculates, in the base unit, sensor orientation from the IMU sensor data. In one embodiment, the combined inputs from the IMU sensors can be used to determine the position, velocity, acceleration, and/or orientation of the object in a three-dimensional space to which object the IMU sensors are attached (e.g., fingers or hands of a user utilizing the device).

In step 305, the method transmits the sensor orientation data and/or other sensor data from the base unit to the host having system software and application software. In step 307, the method receives, in the system software of the host, the sensor data from the base unit In some embodiments, the method transmits the sensor orientation data via a wireless interface (e.g., a Bluetooth and/or Wi-Fi interface). As described herein, a host comprises a remote computing device such as a laptop, desktop, video game console, mobile device, tablet device etc.

In step 309, the method calculates, by the system software, dynamic hand movement characteristics in space.

In some embodiments, dynamic hand movement characteristics comprise data representing the movement of a user's hand as a function of time. In alternative embodiments, dynamic hand movement characteristics comprise movement characteristics of portions of a user's hand (e.g., fingers). In this embodiment, the method utilizes sensor recordings from the IMUs located on rings present on a user's fingers (as described more fully in connection with FIGS. 1 and 2).

In step 311, the method calculates, by the system software, the positions and orientations of the components of the input device in space. In some embodiments, the method may compute the position and orientation of each IMU. In alternative embodiments, the method may group IMUs and compute the position and orientation of a set of IMUs (e.g., those IMUs located on a single device). In some embodiments, the method may group IMUs based on a stored identifier of the type of handheld device including the IMUs (e.g., a mapping of device identifiers to IMU locations).

In step 313, the method identifies, by the system software, positions and movements of the fingers and hand on which the input device is worn. As discussed previously, in some embodiments, a device may include IMUs on each of the user's fingers. In this embodiment, the method calculates the movement of a user's fingers (e.g., in order to calculate simulated keystrokes of a user's fingers).

In step 315, the method recognizes gestures from the positions and movements of the fingers and hand. In some embodiments, the method may aggregate sensor data as a function of time and detect patterns of movement according to a predefined movement interval. For example, a predefined interval of 10 milliseconds may be used as a gesture "window" and data points within this window may be sample to detect the presence of a gesture. In alternative embodiments, the method may utilize a set of predefined rules defining the start of a gesture (e.g., a rapid lateral movement of a sensor).

In step 317, the method detects a recognized gesture or touch pad movement. As described above, in step 315, the method detects all or substantially all gestures of the user. However, the method may only recognize a limited subset of the gestures as valid gestures (or touch pad movements). For example, a virtual/augmented reality application (e.g., game) may only respond to a limited number of well-defined gestures. In this step, the method filters the detected gestures to determine if the user has performed one or more of the well-defined gestures. In some embodiments, well-defined gestures may be stored as a set of constraints or rules that define the motion characteristics of the gesture (and/or the type of sensor or body party corresponding to the gesture).

In step 319, the method dispatches an event notifying the gesture to the application software. In some embodiments, dispatching an event may comprise causing an interrupt, initiating an inter-process communication message, or similar mechanism to cause an evented message to be transmitted to an application. For example, a virtual/augmented reality application may initialize an event "listener" wherein the method may emit events to be handled by the listener. In some embodiments, the event may include various details regarding the event such as the time, gesture type, sensor type, etc.

In step 321, the method application software performs operations in response to the gesture (e.g., providing tactile feedback via activating haptic actuator(s)). In some embodiments, performing operations may include updating a display of a virtual/augmented reality (e.g., by simulating the users action). Alternatively, or in conjunction with the foregoing, performing an operation may comprise issuing a network request or entering input (e.g., text) into a form or similar structure. The aforementioned operations are not intended to be limiting and, indeed, the gesture may be configured to performed any action required by the application software.

Additionally, disclosed herein is a game controller that can be used for interaction in VR/AR applications to provide data input and control interfaces. The VR/AR applications may be implemented on mobile platforms for training, simulations, games, etc.

Game controllers of the present application address a key challenge in virtual reality of converting the hand movements of users in real time as inputs to virtual reality for interactive communication between the users and the virtual reality. The game controllers of the present application make it easier and more convenient to enter information into a computing device (e.g., mobile devices, personal computers, game consoles, media players) for virtual reality interaction. The game controller can also be used to control video games or computer games.

Conventional input devices have difficulties in visualization of user's hand movements in space in real-time with low delays, not capable of providing high precision motion input converted from the movements of the hands of users, not ergonomically adapted for human bodies, may cause discomfort when uses, not capable of recognizing user's hand gesture in the space in real time, and/or being limited to specific platforms (e.g., may not work with virtual reality headsets), etc.

For example, a keyboard (physical or virtual) and a mouse (or trackball, joystick, a touch pad or touch screen) are typically used to provide inputs to computers. User input may be entered to a computer via voice commands or an optical gesture recognition system. A glove with sensors may also be used to provide user input to computers. Some input devices may track positions in the space using optical sensors.

Conventional user interfaces implemented using keyboard and mouse require training for skills to enter data rapidly, require unnatural hand positions for operation, which may cause diseases in joints, nerves and muscles, and require the user to extend their arms to reach and generate keystrokes.

Voice and optional input require the absence of noise and virtual disturbances, technological resources, and/or additional equipment.

Gloves with sensors may have shortcomings in awkwardness, immobility, redundancy of components, limited concept, etc.

Typical joysticks have limited capabilities in defining a position in space and issues with mobility and cross-platform applications.

Figure 4:
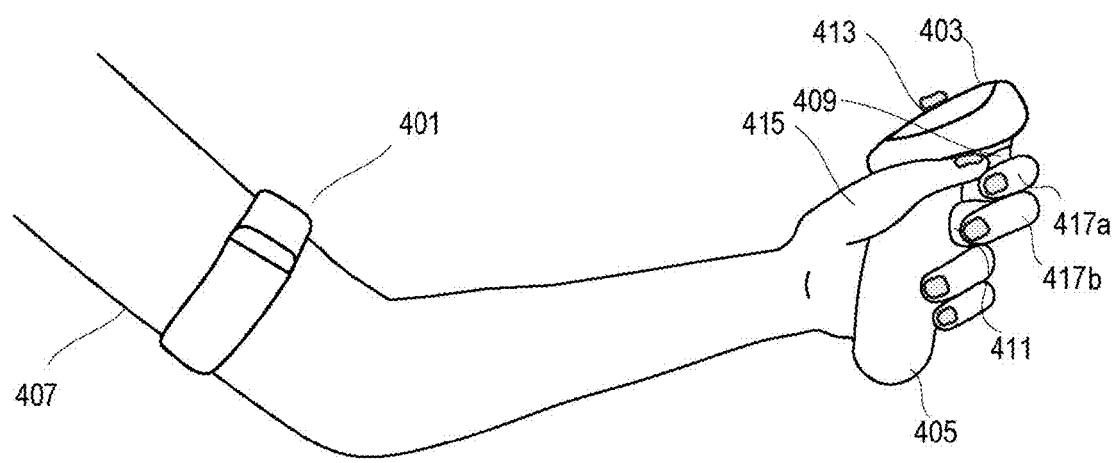
FIG. 4 illustrates a game controller according to some embodiments of the disclosure.
Figure 5:
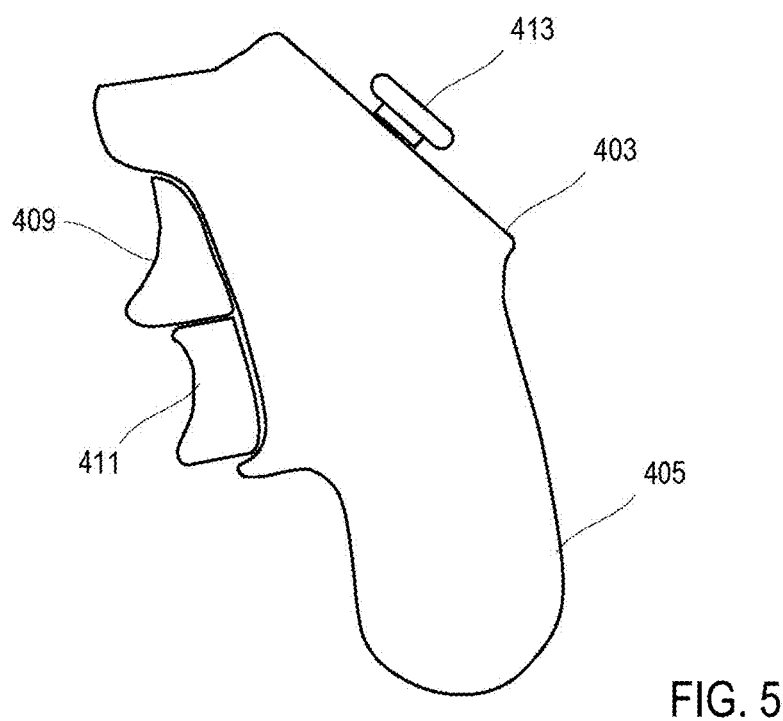
FIG. 5 is a side view of a handheld module of the game controller of FIG. 4.

FIG. 4 illustrates a game controller according to some embodiments of the disclosure. FIG. 5 is a side view of a handheld module of the game controller of FIG. 4.

In FIG. 4, the input device includes an arm/shoulder module (401) and a handheld module (403) enclosed in separate enclosures and can be moved independently from each other. The arm/shoulder module (401) and the handheld module (403) are connected to each other for communication via a wireless communication link, or a wired communication link.

The handheld module (403) has inertial sensors (inertial measurement unit (IMU), microelectromechanical systems (MEMS) sensors) disposed within the enclosure of the handheld module (403). The handheld module (403) has a handle portion (405) that is adapted to be held in a hand of a user, where the palm and fingers of the hand can wrap around the handle portion (405) in an ergonomic way.

The arm/shoulder module (401) also has inertial sensors (as described supra) disposed within the enclosure of the arm/shoulder module (401).

The arm/shoulder module (401) is adapted to be secured to a shoulder or upper arm (407) of the user (e.g., via a strap).

The handheld module (403) inputs touch-based input devices and/or finger-pressing-based input devices, such as buttons, pointing stick (413), trackball, touch pad, triggers (411 and 409), etc. The triggers (411 and 409) are conveniently located at the handle portion (405) near where the fingers (417a and 417b) wrap around in holding the handle portion (405). Some of the control elements, such as the pointing stick (413), buttons, trackball, and/or touch pad, are configured on the top surface of the handheld module (403), where the thumb (415) of a hand may conveniently operate at least some of the control elements configured on the top surface while the hand is holding the handle portion (405).

The handheld module (403) has a microcontroller configured within its enclosure to collect data from the inertial sensors located within the handheld module (403) and the arm/shoulder module (401), as well as the input data from the input devices configured on the handheld module (403) (e.g., buttons, pointing stick (413), trackball, touch pad, triggers (411 and 409), etc.). The microcontroller processes the input data it collects from the inertial sensors and the input devices. Alternatively, the microcontroller may be configured in the arm module (401), instead of in the handheld module (403).

The input device of FIG. 4 includes a communication device (located within the handheld module (403) and/or the arm/shoulder module (401)) that communicates the processed data from the microcontroller to a host computing device (e.g., a smartphone, a personal computer, a laptop computer, a game console, a virtual reality headset). Preferably, the communications between the input device of FIG. 4 and the host computing device is performed over a wireless communication connection (e.g., a Bluetooth connection, or a Wi-Fi connection).

A software program executed by the microcontroller of the input device of FIG. 4 converts and/or filters the raw signals from the inertial sensors and the input devices (e.g., buttons, pointing stick (413), trackball, touch pad, triggers (411 and 409), etc.) to generate standardized input for the host computer. In some embodiments, the device in FIGS. 4 through 7 is configured to perform the method described in connection with FIGS. 1 through 3.

A system software program executed in the host computer performs a low-level interaction between the input device of FIG. 4 and the host computer. An application software program uses the input from the input device for an application specific purpose (e.g., controlling an aspect of a virtual reality, an augmented/mixed reality, a game, a simulation, etc.).

The inertial sensors in each of the arm/shoulder module (401) and handheld module (403) may include MEMS accelerometers, a MEMS gyroscope, and/or a magnetometer.

The MEMS accelerometers measure the difference between the true acceleration of the accelerometers and the gravitational acceleration of the accelerometers. The MEMS gyroscope measures the angular velocity of the gyroscope. The magnetometer measures the magnitude and direction of the magnetic field at the location of the magnetometer. The combined inputs from the inertial sensors can be used to determine the position, velocity, acceleration, and/or orientation of the object in a three-dimensional space to which object the inertial sensors are attached. In some implementations, magnetometers are not used.

In general, the input devices configured on the handheld module (403) can be of any type that can be operated by the user via touching using a finger, or pressing by a finger of a hand of a human user.

The microcontroller of the input device links the components of the input devices together, processes the data from the sensors and input devices, and transfers the processed information to the host computing device via the communication device.

The input device can be powered via a battery to operate the microcontroller and the communication device.

The input device may use separate communication devices to communicate between the arm/shoulder module (401) and the handheld module (403) and to communicate to the host computing device. For example, the input device may use a wired connection or a Bluetooth connection for communication between the arm/shoulder module (401) and the handheld module (403) and uses a Wi-Fi connection for communication with the host computing device.

Alternatively, communications between the arm/shoulder module (401) and the handheld module (403) and communications to the host computing device may share a common device. For example, a wireless communication unit of the handheld module (403) is used to communicate to both the arm/shoulder module (401) and the host computing device (e.g., via Bluetooth or Wi-Fi). In another example, a wireless communication unit of the arm/shoulder module (401) is used to communicate to both the handheld module (403) and the host computing device (e.g., via Bluetooth or Wi-Fi).

In some instances, an additional module having a set of inertial sensors is adapted to be secured to the wrist, hand, or the back of the hand, or forearm of the user, in a way as the arm/shoulder module (401) is adapted to be secured to the upper arm or the shoulder of the user.

In some instances, the input device has visual indicators (e.g., LED or LCD indicators or displays) to display certain data form the microcontroller. The visual indicators may be mounted on the arm/shoulder module (401) and/or the handheld module (403). Some of the visual indicators may be configured in an additional module that is separate from the arm/shoulder module (401) and/or the handheld module (403) and that is adapted to be secured to a location in the arm of the user. The visual indicators may be arranged in a form of placard.

Further, the input device may optionally include a vibro motors (actuators) to provide feedback to the user. The input device may include a further optional input device for data entry or an additional way to determine the position and/or orientation of the user and/or the hand of the user in the space, such as the use of a camera of a smartphone, a tablet computer, a personal media player, a notebook computer, a personal computer.

In some instances, the handset (403) configured to be secured to the hand of the user without requiring the user to wrap a hand around a handle portion (405), such that the handset (403) will remain in the hand of the user even when the user open the hand and extends the fingers without actively gripping on the handset (403). For example, the handset (403) may include a strap for attaching to the hand and/or in the form of the device of FIG. 1.

In a typical application, the user is to wear an arm/shoulder module (401) that measures the position and orientation of the arm (407). Software is installed on a hosting computing device (e.g., a smart phone, a tablet computer, a personal computer, a game console). The handheld module (403) determines the position and orientation of the hand of the user and input devices (e.g., a button, pointing stick, a touch sensor). The handheld module (403) communicates with the arm/shoulder module (401) and the host computer to provide inputs to the application running in the host computer.

For example, the microcontroller of the input device receives data from the shoulder module, processes the data together with the data from the sensors and input devices on the handheld module, and sends the processed data to the host computer wirelessly or via a wired connection. The data can be processed by the microcontroller and/or the host computer to recognize gestures to control the application software.

Figure 6:
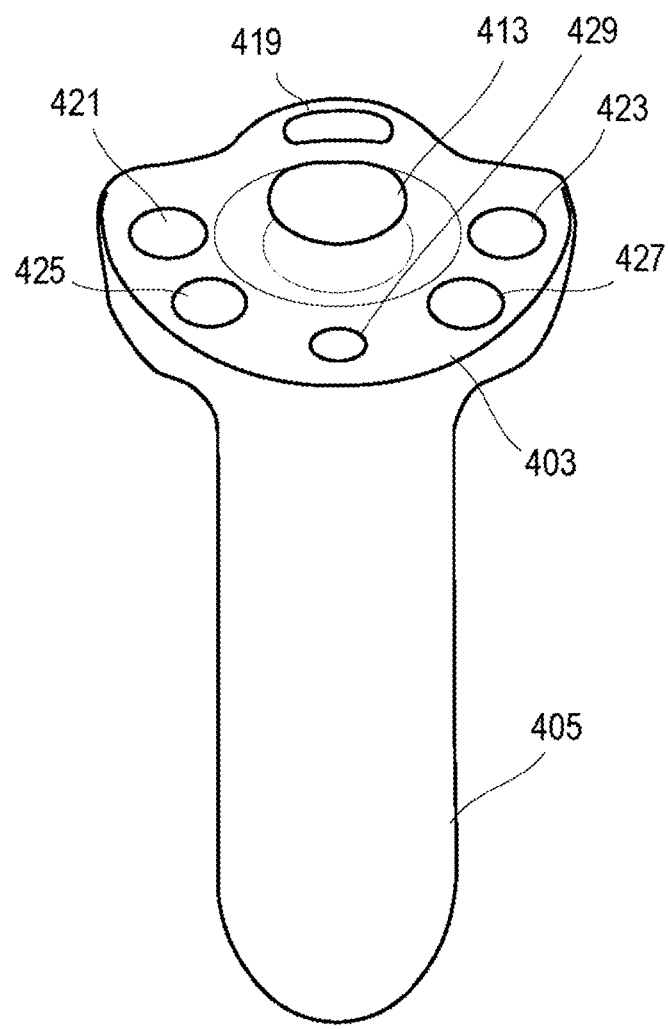
FIG. 6 is a front view of the handheld module of the game controller of FIG. 4.

FIG. 6 is a front view of the handheld module of the game controller of FIG. 4.

In FIG. 6, the top control surface includes a power button (419) with an LED indicator. The power button (419) can also be used to pair/unpair the input device with host computing device (e.g., a smartphone, computer or other).

For example, to unpair the input device from a previously paired host computer, a user may press the power button (419) to first turn offer the input device. When the device is turned off, the LED indicator is dark. While the device is switched off, the user may depress the power button (419) for a time period exceeding a predetermined threshold (e.g., 2 seconds), which causes the LED to blink, indicating that unparing is completed.

For example, to pair the input device with a host computer, the user may press the power button (419) to turn on the input device. When the input device is turned on, the LED indicator is on. When the input device is not already paired with a host computer, or has been unpaired, the input device is automatically placed in a paring mode; and the user may open the Bluetooth paring setting user interface on the host computer to complete the pairing with the input device.

In FIG. 6, the input device has a joystick (413) that provides input that is based on the position of the joystick (413) in relation to a default center/initial position.

In FIG. 6, the input device has a calibration button (429), which when activated can call a calibration tool for calibration in a virtual space.

In FIG. 6, the input device action buttons (421, 423, 425 and 427). An application software may use the action buttons (421-427) for the activation of different operations when the respective action buttons (421-427) are pressed. The quantities of the action buttons (421-427) may be reduced or increased for different designs.

Figure 7:
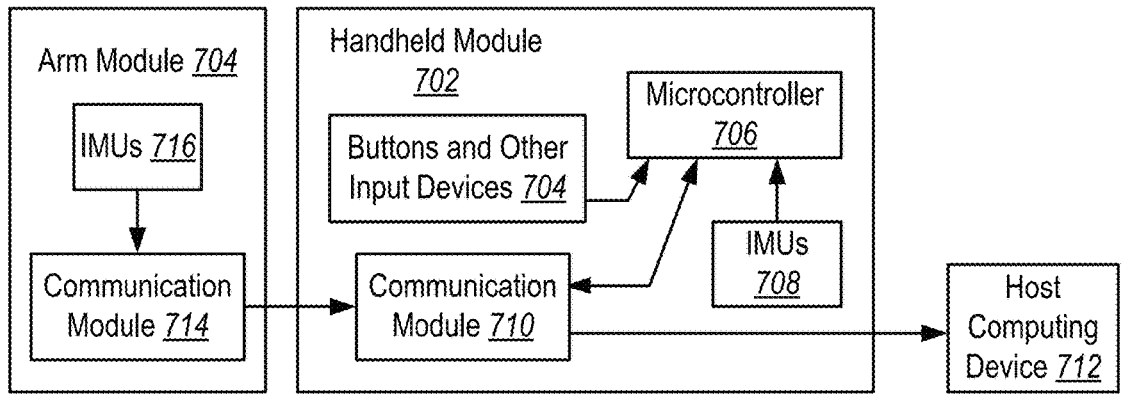
FIG. 7 illustrates a game controller according to some embodiments of the disclosure.

FIG. 7 illustrates a game controller according to some embodiments of the disclosure.

As illustrated in FIG. 7, a handheld module (702) includes a microcontroller unit (706), a plurality of inertial sensors (IMUs) (708), a communication module (710) such as a wireless transceiver or wired network interface, and a plurality of buttons or other devices (704). Various components of the handheld module (702) are described more fully in connection with FIGS. 1 and 2, the disclosure of which is incorporated herein by reference in its entirety.

As illustrated in FIG. 7, an arm module (704) includes one or more inertial sensors (716) and a communication module (714). As illustrated, communication module (714) may comprise a module similar to module (710). In some embodiments, communication module (714) comprises a wireless transceiver (e.g., a Bluetooth or Wi-Fi transceiver).

In the illustrated embodiment, arm module (704) communicates with handheld module (702) via communication modules (714, 710). In some embodiments, communications between arm module (704) and handheld module (702) may comprise wired or wireless communications. As described previously, arm module (704) may be configured to record sensor and/or manual input data and transmit the recorded data to handheld module (702) for further processing.

Additionally, as illustrated in FIG. 7, handheld module (702) may be configured to process sensor data (as described more fully in connection with FIGS. 1 and 3) and transmit the processed data to host computing device (712). In some embodiments, host computing device (712) comprises a laptop, desktop, mobile device, tablet device, or other computing device as discussed previously. Although illustrated as receiving data from communication module (710), host computing device (712) may alternatively, or in conjunction with the foregoing, receive data from arm module (704) via communication module (714).

Figure 8:
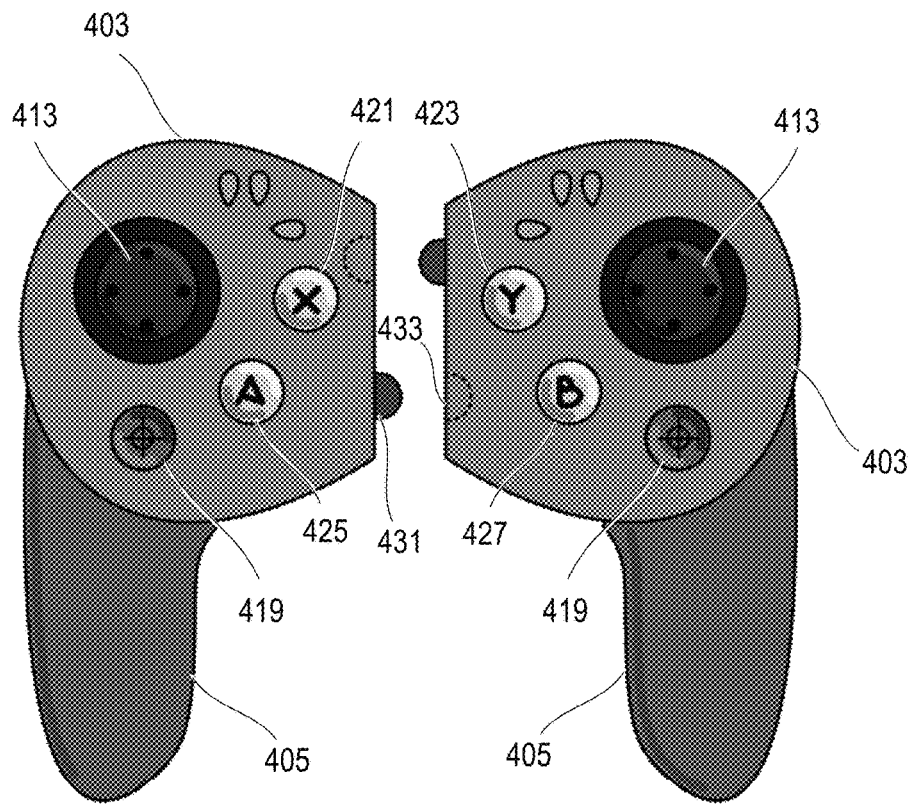
FIG. 8 illustrates two handheld modules of game controllers adapted for left hands and right hands respectively according to some embodiments of the disclosure.

FIG. 8 illustrates two handheld modules of game controllers adapted for left hands and right hands respectively according to some embodiments of the disclosure.

In FIG. 8, the handle portions (405) are for the left and right hands of a user. The left and right hand modules (403) can be used by both hands independent from each other. In handheld modules (403) have power buttons (419), action buttons (421-427) and joysticks (413). The knobs (e.g., 431) and receptacles (e.g., 433) allow the user to push the left and right hand modules (403) together against each other and lock the left and right hand models (403) with each other as one unit. The combined unit can be separated into two hand modules (403) by pulling them apart.

Figure 9:
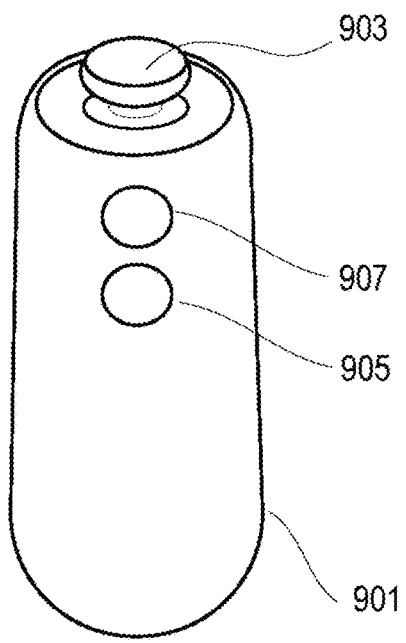
FIG. 9 illustrates a top view of a game controller according to some embodiments of the disclosure.
Figure 10:
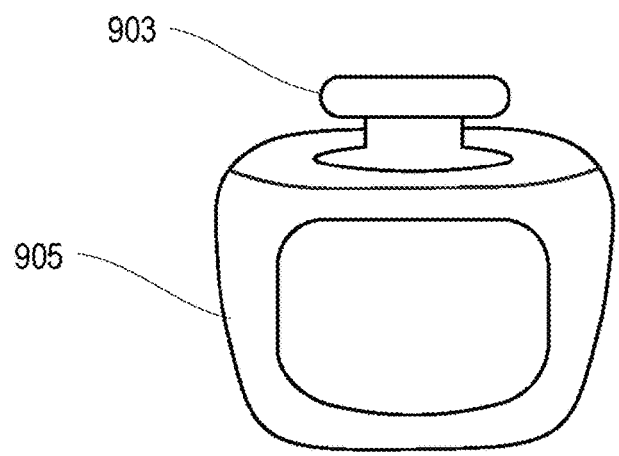
FIG. 10 is a front view of the game controller of FIG. 9.
Figure 11:
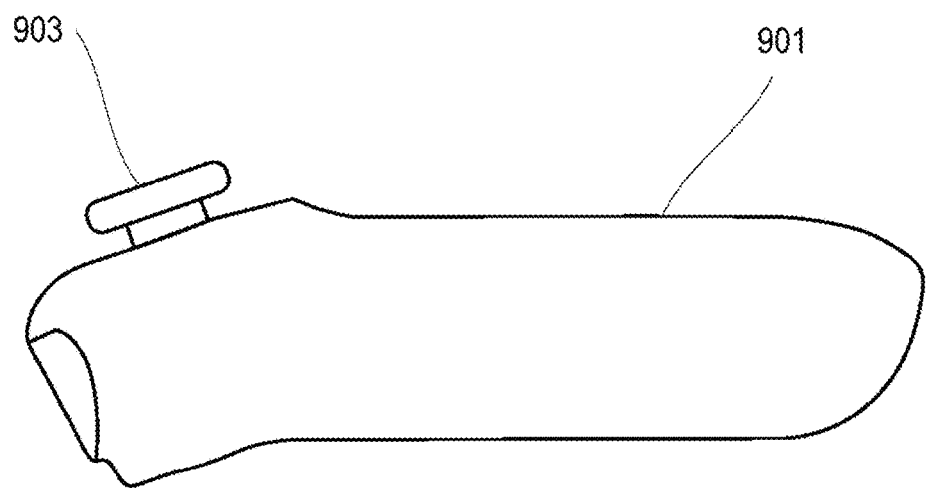
FIG. 11 is a side view of the game controller of FIG. 9.

FIG. 9 illustrates a top view of a game controller according to some embodiments of the disclosure. FIG. 10 is a front view of the game controller of FIG. 9. FIG. 11 is a side view of the game controller of FIG. 9.

The game controller (901) is adapted for hand held and has a job stick (903), a power button (905), and an action button (907). The game controller (901) may be used without an arm/shoulder module (e.g., 120). In some instances, an arm/should module (e.g., 120) can be optionally added for communication with the handheld game controller (901) (e.g., via a wired or wireless connection).

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

The subject matter described above may be embodied in a variety of different forms and, therefore, the application/description intends for covered or claimed subject matter to be construed as not being limited to any example embodiments set forth herein; example embodiments are provided merely to be illustrative. Likewise, the application/description intends a reasonably broad scope for claimed or covered subject matter. Among other things, for example, subject matter may be embodied as methods, devices, components, or systems. Accordingly, embodiments may, for example, take the form of hardware, software, firmware or any combination thereof (other than software per se). The description presented above is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. The application/description intends, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium that can be used to tangibly store the desired information or data or instructions and that can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application that receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A data input device comprising:
a base unit adapted to be strapped to a backside of a hand of a user;
a plurality of inertial sensor units;
a plurality of rings configured to be worn on fingers of the hand of the user, wherein the plurality of inertial sensor units are respectively mounted in the plurality of rings, each of the plurality of rings includes a respective wireless transceiver to transmit sensor data to the base unit, each of the plurality of rings is communicatively coupled to the base unit via the respective wireless transceiver;
one or more touch input devices, wherein the one or more touch input devices includes a touchpad device mounted on one of the plurality of rings and adapted to receive touch inputs activated by a thumb of the hand of the user;
a microcontroller configured to collect sensor data from the inertial sensor units and the one or more touch input devices, and to process the sensor data to generate processed sensor data, wherein the base unit houses the microcontroller;
a plurality of vibration haptic actuators communicatively coupled to the microcontroller, wherein each actuator is at a respective one of the rings;
a first wireless transceiver configured to transmit the processed sensor data to a host computer, wherein the base unit further houses the first wireless transceiver; and
an arm module adapted to be secured to a shoulder or upper arm of the user, wherein the arm module houses an additional inertial sensor unit and a second wireless transceiver, wherein the arm module and base unit are independently moveable with respect to one another, and wherein the arm module is configured to record manual input data and transmit the recorded data to the base unit for further processing.

2. The data input device of claim 1 wherein the base unit further comprises a base inertial sensor unit communicatively coupled to the microcontroller.

3. The data input device of claim 1 further comprising a plurality of LEDs communicatively coupled to the microcontroller.

4. The data input device of claim 3 wherein a first set of the plurality of LEDs are mounted within the base unit and wherein a second set of the plurality of LEDs are mounted within the plurality of rings.

5. The data input device of claim 1 wherein the inertial sensor units each include an accelerometer and gyroscope.

6. The data input device of claim 5 wherein the inertial sensor units each include a magnetometer.

7. The data input device of claim 1 further comprising at least one of an ultrasound receiver or an optical marker, wherein each receiver or marker is communicatively coupled to the microcontroller.

8. The data input device of claim 1 wherein the processed sensor data comprises at least one of gyroscope vector data, acceleration vector data, quaternion rotation data, spatial coordinate data of a hand or wrist, or touch data from the one or more touch input devices.

9. A data input device comprising:
a plurality of first inertial sensor units;
a plurality of rings configured to be worn on fingers of the hand of a user, wherein a plurality of second inertial sensor units are respectively mounted in the plurality of rings;
one or more touch input devices, wherein the one or more touch input devices comprise one or more trigger devices located on a front portion of a handheld module adapted to be held in the hand of the user and further adapted to be manipulated by the fingers of the user while the user is holding the handheld module;
a microcontroller configured to collect sensor data from the first inertial sensor units, the second inertial sensor units, and the one or more touch input devices, and to process the sensor data to generate processed sensor data;
a first wireless transceiver configured to transmit the processed sensor data to a host computer;
an arm module adapted to be secured to a shoulder or upper arm of the user, wherein the arm module houses an additional inertial sensor unit and a second wireless transceiver, wherein the arm module and handheld module are independently moveable with respect to one another, and wherein the arm module is configured to record manual input data and transmit the recorded data to the handheld module for further processing;

an additional module adapted to be secured to a wrist, hand, back of a hand, or forearm, wherein the additional module comprises a set of inertial sensors; and a plurality of vibration haptic actuators communicatively coupled to the microcontroller, wherein each actuator is at a respective one of the rings;

wherein the plurality of first inertial sensor units, the one or more touch input devices, the microcontroller and the first wireless transceiver are housed within the handheld module;

wherein each of the plurality of rings includes a respective wireless transceiver to transmit sensor data to the handheld module.

10. The data input device of claim 9 wherein the one or more touch input devices include touch input devices located on a top side of the handheld module selected from the group consisting of buttons, pointing sticks, trackballs, and touchpads.

11. The data input device of claim 9 wherein the handheld module further comprises a knob and a receptacle, wherein the knob of the handheld module is configured to be locked into a receptacle of a secondary handheld module and wherein the receptacle of the handheld module is configured to receive a knob of the secondary handheld module.

12. The data input device of claim 9 wherein the touch input devices comprise a joystick, power button, and action button arranged on a top side of the handheld module, and wherein the touch input devices are capable of being manipulated by a thumb of the user.

13. A method comprising:
receiving sensor data from a handheld device;
calculating hand movement characteristics in three-dimensional space based on the sensor data;
calculating the position and orientation of the components of the handheld device;
recording, by an arm module, manual input data, wherein the arm module is adapted to be secured to a shoulder or upper arm of a user, wherein the arm module houses an inertial sensor unit and a first wireless transceiver, and wherein the arm module and handheld device are independently moveable with respect to one another;
transmitting, by the arm module, the recorded data to the handheld device for further processing;
identifying positions and movements of fingers of the user manipulating the handheld device, wherein a plurality of rings are worn on the fingers of the user, wherein a plurality of inertial sensor units are respectively mounted in the plurality of rings, wherein each of the rings includes a second wireless transceiver to transmit sensor data, and wherein a vibration haptic actuator is located at each of the rings;
identifying a gesture from the positions and movements of the fingers of the user manipulating the handheld device;
identifying a recognized gesture corresponding to the identified gesture; and
dispatching an event notifying the gesture to an application.

* * * * *